July 18, 1967 R. C. SHELLEY 3,331,652
WIDE ANGLE OBJECTIVE OF THE INVERTED TELEPHOTO TYPE
Filed Sept. 12, 1963
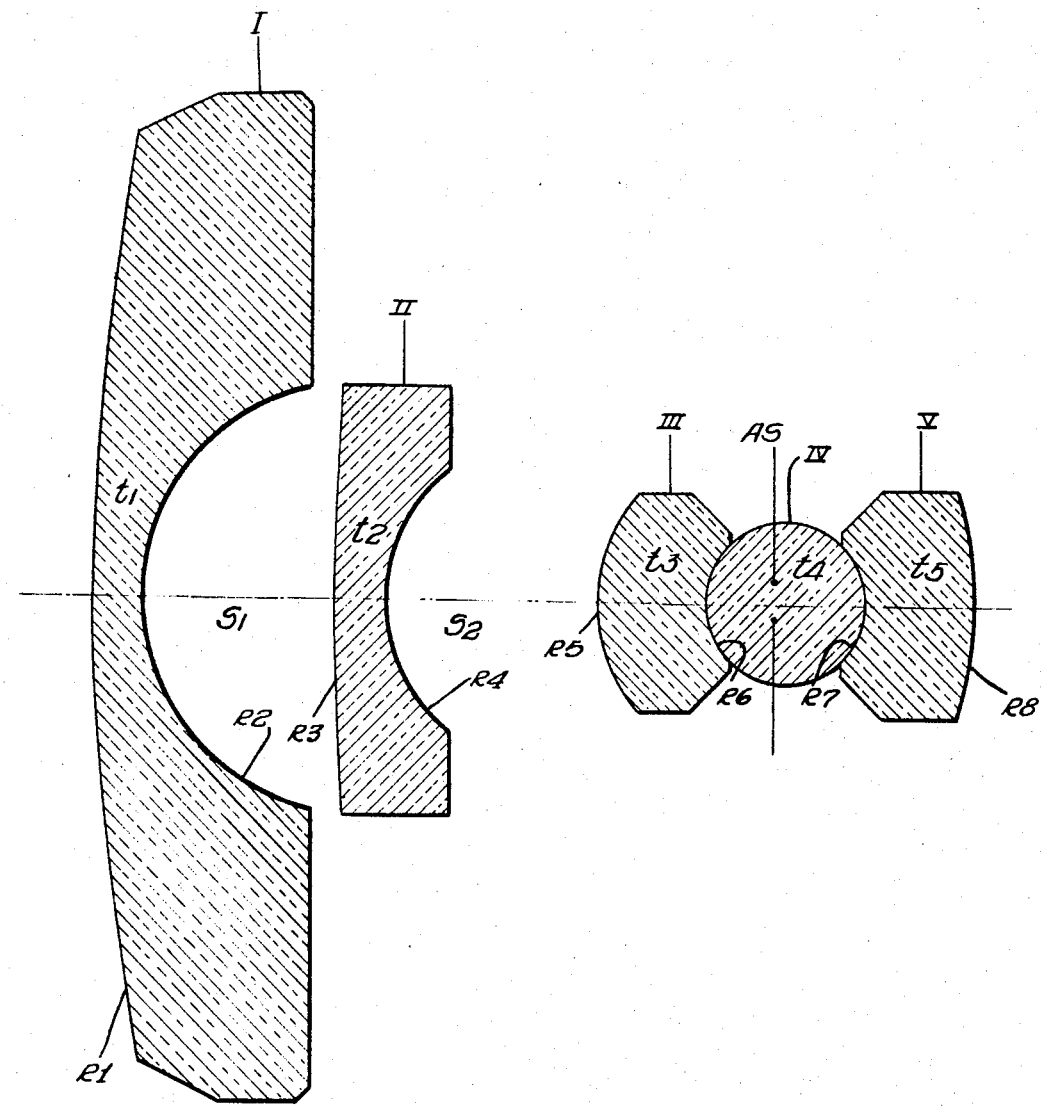
INVENTOR.
Rick C. Shelley,
BY
Byron, Hume, Grown + Clement
Attys.

3,331,652
WIDE ANGLE OBJECTIVE OF THE INVERTED TELEPHOTO TYPE
Rick C. Shelley, Huntington Beach, Calif., assignor to Chicago Aerial Industries, Inc., Barrington, Ill., a corporation of Delaware
Filed Sept. 12, 1963, Ser. No. 308,517
4 Claims. (Cl. 350—225)

This invention relates to optical lens structures and more particularly to an improved wide angle objective of the inverted telephoto type.

Numerous attempts have been made to satisfactorily employ so-called wide angle lenses (i.e. objectives which are corrected to cover a larger field angle than the average objective) in a variety of applications. However, for the most part, the use of such lenses and/or the field of coverage offered thereby has been limited by distortive effects and various aberrations for which little compensation or correction is provided in such prior lens structures.

Accordingly, it is a prime object of the present invention to provide an improved optical lens structure which yields an extremely wide angle of view, while at the same time being well corrected for the adverse effects of various aberrations.

A further object of the present invention is to provide an extremely wide angle objective of the inverted telephoto type which is suitably corrected for spherical aberration, longitudinal and lateral chromatic aberration, coma, astigmatism and field curvature.

Still another object of the present invention is to provide an improved wide angle objective which is reasonably free from both chromatic and monochromatic zonal field aberrations and from vignetting over a wide angle of coverage of approximately 180°.

An additional object of the present invention is to provide an inverted telephoto objective which is suitable for use in cameras and the like, which is relatively compact in construction, and which can be reliably employed in various applications calling for an extremely wide angle of view (i.e. aerial reconnaissance, oceanography studies, confined area photography, missile scoring, meteorology studies, etc.).

Other objects and advantages of the present invention will become apparent from the following description of one preferred embodiment thereof when considered in conjunction with the accompanying drawing wherein the single figure is a simplified cross-sectional view of a wide angle objective in accordance with the present invention.

In general, the present invention is directed to an improved wide angle objective of the inverted telephoto type which provides an angular coverage of approximately 180°. The objective is corrected for the various aberrations so that the objective does not suffer from and is not inhibited by such aberrations, while at the same time providing the desired wide angle of view. Preferably, the objective consists of multielement forward and rearward lens structures. The forward lens structure functions to correct for certain of the aberrations conventionally encountered by wide angle objectives. At the same time, this forward lens structure yields the necessary power to provide a wide field angle and reduces this extreme angle of view to a reasonable angle that can be handled by the rearward lens structure. In turn, the rearward lens structure corrects for other aberrations (e.g. chomatic aberrations) and produces a highly satisfactory imagery for the wide angle of view covered by the objective.

It should be understood that the following detailed description of a preferred embodiment of the wide angle objective is directed to the optical characteristics of this objective. Therefore, the method of and structure for mounting the objective and other structural aspects of a completed lens do not form a part of the invention and shall not be dealt with herein.

Referring specifically to the drawing, the illustrated embodiment of the wide angle objective is comprised of five individual lens elements or units which are designated by the numerals I, II, III, IV, and V, respectively. The lens elements I and II, which are preferably considered a unitary divergent member, form the front portion of the objective. The three lens elements III, IV, and V form an optical triplet that is the convergent rear member of the objective.

More particularly, each of the two lens elements I and II that form the divergent front member has a convex-concave shape. The dimensions of the elements I and II are large in comparison with the dimensions of the elements comprising the rearward convergent member so that the necessary power is obtained with the objective to yield a sufficiently wide angle of view. Moreover, the convex surfaces of these elements are disposed so as to face the longer conjugate of the objective. This arrangement of the divergent, convex-concave elements I and II reduces the extreme angle of view of the objective from approximately 180° to a reasonably small angle that can be effectively handled by the convergent rear member. The front member of the objective formed by the divergent elements I and II has a strong influence on the extra-axial image aberrations, and in this connection, contributes to the correction of the monochromatic aberrations.

The triplet that forms the rearward member of the objective is, as previously described and as illustrated, suitably spaced from the divergent front member and is comprised of a relatively thick divergent (i.e. meniscus and substantially concentrically shaped) element III, the convergent and substantially spherical element IV, and another relatively thick divergent (i.e. meniscus shaped) element V. The substantially spherical lens element IV is provided with a suitable peripheral groove adjacent the central plane thereof (i.e. normal to the longitudinal axis of the objective) that serves as an aperture stop AS. As a result of this positioning, the aperture stop AS functions to correct the objective for coma and other aberrations caused by lack of symmetry. In the illustrated embodiment of the objective, the divergent and meniscus shaped elements III and V are sufficiently large in comparison to the substantially spherical convergent element IV and are wrapped around a sufficient portion of this element to effectively eliminate vignetting in the objective. Moreover, the divergent power of these elements has a substantial influence on the objective being satisfactorily color corrected.

Although the central element IV of the triplet is illustrated as being substantially spherical, it should be understood that two mating, plano-convex elements can be satisfactorily employed in lieu of this spherical element. If two such elements are employed, at least one of the elements is provided with a peripheral cut-away portion adjacent the mating surface thereof so as to form the aperture stop AS.

Preferably, each of the divergent convex-concave elements I and II is formed of a low index, low dispersion glass such as a suitable fluorine crown glass. Similarly, the divergent elements III and V are preferably formed of a high index, high dispersion glass (e.g. a special dense flint), and the convergent central element IV is formed of a high index, low dispersion, special rare earth glass such as lanthanum crown.

The specific glass types and the dimensions, in inches, of one specific and preferred embodiment of the objective are set forth in the following table:

| Element | Glass types | $N_D$ | $V_D$ | Radii | Thicknesses | Spaces |
|---|---|---|---|---|---|---|
| I | FK-5 | 1.487 | 70.0 | $R_1=+3.2680$ $R_2=+0.4228$ | $t_1=0.1074$ | $s_1=0.3828$ |
| II | FK-5 | 1.487 | 70.0 | $R_3=+6.3890$ $R_4=+0.3300$ | $t_2=0.0934$ | $s_2=0.4249$ |
| III | SFS-3 | 1.784 | 26.1 | $R_5=+0.3571$ | $t_3=0.2264$ | |
| IV | EK-210 | 1.734 | 51.0 | [1] $R_6=+0.1666$ | $t_4=0.3335$ | |
| V | SFS-3 | 1.784 | 26.1 | [1] $R_7=-0.1666$ $R_8=-0.5952$ | $t_5=0.2100$ | [2] $s_3=0.4368$ |

[1] Common.
[2] $s_3$ = Back focus.

In the preferred embodiment outlined above, the sum of the surface powers of the element I was between approximately −21 and −32 percent of the total power of the objective. The sum of the surface powers of the element II was between approximately −29 and −43 percent of this total power. The sum of the surface powers of the front and rear surfaces of the triplet were determined to be between approximately +79 and +97 percent of total power of the objective, and the sum of the surface powers of the substantially spherical element IV when surrounded by air was founded to be between approximately +200 and +250 percent of the total power of the objective.

These relative surface powers were computed on the basis of dividing the absolute surface powers by the power of the objective and multiplying the quotient by 100, the power of the objective being the reciprocal value of the effective focal length of the whole objective. The absolute surface powers employed in these computations were obtained by dividing the index difference by the radius of curvature of the surface. The index difference was determined by subtracting the refractive index of the medium in front of the surface from the refractive index of the medium in the rear of the surface. In effecting these calculations, the radii of curvature were designated positive if the vertex of the surface was located in front of the center of curvature and negative if the vertex of the surface was located to the rear of the center of curvature.

The dimensions of the air spaces between the Elements I and II forming the front member of the objective and between the Elements II and III are set forth in the foregoing table. To achieve desirable results with the objective of the present invention, these dimensions are between approximately 75 and 120 percent of the back focal length, and the back focal length of the objective is selected to be between approximately 120 and 200 percent of the equivalent focal length.

A wide angle objective corresponding to the specific embodiment outlined above was employed in a camera to photograph an area with an angle of coverage of 180° at a relative aperture of $f/6.3$. This embodiment of the objective scaled to an equivalent focal length of approximately .25 inch yielded a picture of approximately .72 inch in diameter on 35 mm. film. The objective was essentially free from both chromatic and monochromatic axial and field aberrations over an angle of coverage of approximately 180° and was free from vignetting over the full field.

It should be understood that the foregoing is merely illustrative of the invention. Although satisfactory results have been realized when employing an inverted telephoto objective corresponding to the preferred embodiment previously described, various modifications of the invention could be devised by one skilled in the art to achieve similarly satisfactory results without departing from the invention. However, such modifications would clearly fall within the scope of the invention as set forth in the accompanying claims.

What is claimed is:

1. A wide angle objective of the inverted telephoto type having at least five lens elements and wherein the constructional data of the lens elements are as follows:

| Element | Glass types | $N_D$ | $V_D$ | Radii | Thicknesses | Spaces |
|---|---|---|---|---|---|---|
| I | FK-5 | 1.487 | 70.0 | $R_1=+3.2680$ $R_2=+0.4228$ | $t_1=0.1074$ | $s_1=0.3828$ |
| II | FK-5 | 1.487 | 70.0 | $R_3=+6.3890$ $R_4=+0.3300$ | $t_2=0.0934$ | $s_2=0.4249$ |
| III | SFS-3 | 1.784 | 26.1 | $R_5=+0.3571$ | $t_3=0.2264$ | |
| IV | EK-210 | 1.734 | 51.0 | [1] $R_6=+0.1666$ | $t_4=0.3335$ | |
| V | SFS-3 | 1.784 | 26.1 | [1] $R_7=-0.1666$ $R_8=-0.5952$ | $t_5=0.2100$ | [2] $s_3=0.4368$ |

[1] Common.
[2] $s_3$ = Back focus.

where $r$, $t$ and $s$ are the radii, thickness and spaces, respectively, and $N_D$ and $V_D$ are the index of refraction in sodium D light, and the reciprocal dispersion ratio, respectively.

2. A wide angle objective of the inverted telephoto type, which objective comprises a divergent front member including first and second convex-concave elements formed of a low index, low dispersion glass; and a convergent rear member; said convergent rear member being an optical triplet that includes a central substantially spherical convergent element formed of a high index, low dispersion glass and a pair of relatively thick meniscus shaped divergent elements formed of a high index, high dispersion glass; said meniscus shaped elements substantially surrounding said convergent elements; said divergent front member and said convergent rear member being spaced apart a distance of approximately .425 inch; said back focal length being approximately .437 inch; the sum of the surface powers of said first convex-concave element being approximately −26 percent of the total power of the objective; the sum of the surface powers of said second convex-concave element being approximately −36 percent of the objective; the sum of the surface powers of the front and rear surfaces of said optical triplet being approximately +90 percent of total power of the objective; and the sum of the surface powers of said central convergent element being approximately +226 percent of the total power of the objective.

3. A wide angle objective which comprises a divergent front member including first and second convex-concave elements; and a convergent rear member; said rear member being an optical triplet that includes a central convergent element and a pair of meniscus shaped divergent elements that substantially surround said convergent element; said front and rear members being spaced apart a distance of approximately .425 inch; said back focal length being approximately .437 inch; the sum of the surface powers of said first convex-concave element being approximately −26 percent of the total power of the objective; the sum of the surface powers of said second convex-concave element being approximately −36 percent of the objective; the sum of the surface powers of the front and rear surfaces of said optical triplet being approximately +90 percent of total power of the objective; and the sum of the surface powers of said central convergent element being approximately +226 percent of the total power of the objective.

4. A wide angle objective of the inverted telephoto type, said objective consisting of a divergent front member including first and second convex-concave elements formed of a low index, low dispersion glass; said first and second convex-concave elements being disposed with their convex surfaces facing the longer conjugate of the objective; and a convergent rear member spaced from said divergent front member along the optical axis of the objective; said convergent rear member being an optical triplet that includes a central spherical convergent element having front and rear concentric surfaces about a center point and being formed of a high index, low dispersion glass and a pair of relatively thick meniscus shaped divergent elements formed of a high index, high dispersion glass; said meniscus shaped elements being joined to and substantially surrounding said spherical convergent element on the optical axis of said objective.

References Cited

UNITED STATES PATENTS 2,522,390    8/1950    McCarthy.

FOREIGN PATENTS 620,538    10/1935    Germany.
124,162    10/1958    Russia.

JEWELL H. PEDERSEN, *Primary Examiner.*

JOHN K. CORBIN, DAVID H. RUBIN,
*Assistant Examiners.*